US008789113B2

(12) United States Patent
Goergen et al.

(10) Patent No.: US 8,789,113 B2
(45) Date of Patent: Jul. 22, 2014

(54) METHOD AND SYSTEM FOR PROVIDING A REMINDER NOTIFICATION FOR A SET-TOP BOX

(75) Inventors: Michael Goergen, Bend, OR (US); Gary W. Lafreniere, Olathe, KS (US); David Emerson, Overland Park, KS (US); David Rondeau, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 579 days.

(21) Appl. No.: 12/201,249

(22) Filed: Aug. 29, 2008

(65) Prior Publication Data

US 2010/0058394 A1 Mar. 4, 2010

(51) Int. Cl.
*G06F 3/00* (2006.01)
*G06F 13/00* (2006.01)
*H04N 5/445* (2011.01)

(52) U.S. Cl.
USPC .............................................. 725/58; 725/62

(58) Field of Classification Search
USPC ..................................................... 725/58, 62
See application file for complete search history.

(56) References Cited

U.S. PATENT DOCUMENTS

| | | | | |
|---|---|---|---|---|
| 7,640,570 | B2 * | 12/2009 | Wagner et al. | 725/132 |
| 2003/0005448 | A1 * | 1/2003 | Axelsson et al. | 725/58 |
| 2003/0121057 | A1 * | 6/2003 | Singh | 725/132 |
| 2003/0140343 | A1 * | 7/2003 | Falvo et al. | 725/51 |
| 2006/0190966 | A1 * | 8/2006 | McKissick et al. | 725/61 |
| 2006/0242665 | A1 * | 10/2006 | Knee et al. | 725/38 |
| 2006/0253886 | A1 * | 11/2006 | Khurana et al. | 725/118 |
| 2007/0180463 | A1 * | 8/2007 | Jarman | 725/28 |
| 2008/0148320 | A1 * | 6/2008 | Howcroft | 725/61 |
| 2009/0052870 | A1 * | 2/2009 | Marsh et al. | 386/124 |
| 2009/0228566 | A1 * | 9/2009 | Sharp et al. | 709/207 |
| 2010/0186038 | A1 * | 7/2010 | Thomas et al. | 725/42 |

* cited by examiner

*Primary Examiner* — Yassin Alata
(74) *Attorney, Agent, or Firm* — Swanson & Bratschun, L.L.C.

(57) ABSTRACT

A method and system for providing a reminder notification for a set-top box is disclosed. An embodiment is disclosed that determines a reminder notification rule for a recipient with at least one descriptor of media content received by a set-top box, queries a database for one or more selections of scheduled media content in accordance with the reminder notification rule, and sends a reminder notification to the recipient based on a query result. Another embodiment is disclosed that receives a request for a usage information of a set-top box in accordance with a reminder notification preference that has a reminder notification rule with at least one descriptor of media content received by a set-top box, and sends the usage information for the set-top box based upon the reminder notification preference.

8 Claims, 14 Drawing Sheets

Content Reminder GUI
500
502 Account Number 1234567
Username: testuser
Password: ********
504 USER 1: Mike Goergen Notification Preferences
Reminder "The Office" "Lost"
[Add New]
Current Selection: "The Office"
Method: wireless
Reminder Message
"You need to get to a TV! The Office is Going to be on soon!"
Channels: NBC Only
Episodes: New Only
Reminder Timing: (prior to program start time)
30 mins
15 min intervals – up to 8 hours
Customer Reminder Message sent to recipients Mike Goergen and Jane Goergen Content Reminder GUI
500

502 Account Number 1234567

Username: testuser

Password: ********

504 USER 1: Mike Goergen Notification Preferences

Reminder ▼ "The Office" "Lost"

[Add New]

Current Selection: "The Office"

Method: ▼ wireless

Reminder Message

"You need to get to a TV! The Office is Going to be on soon!"

Channels: ▼ NBC Only

Episodes: ▼ New Only

Reminder Timing: (prior to program start time)

▼ 30 mins 15 min intervals – up to 8 hours

Customer Reminder Message sent to recipients Mike Goergen and Jane Goergen

Figure 5

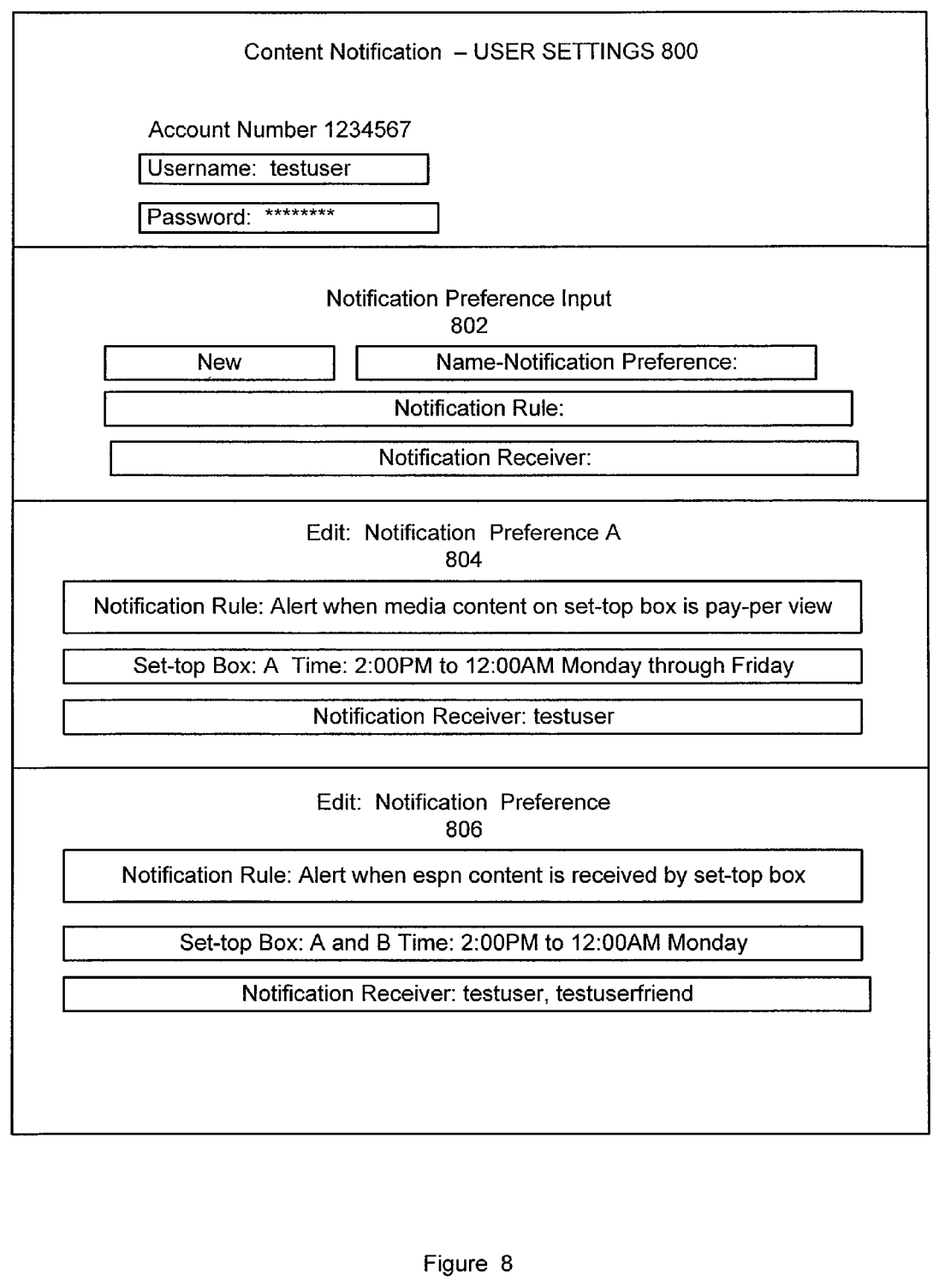

Content Notification – USER SETTINGS 800

Account Number 1234567

Username: testuser

Password: ********

Notification Preference Input
802

New

Name-Notification Preference:

Notification Rule:

Notification Receiver:

Edit: Notification Preference A
804

Notification Rule: Alert when media content on set-top box is pay-per view

Set-top Box: A Time: 2:00PM to 12:00AM Monday through Friday

Notification Receiver: testuser

Edit: Notification Preference
806

Notification Rule: Alert when espn content is received by set-top box

Set-top Box: A and B Time: 2:00PM to 12:00AM Monday

Notification Receiver: testuser, testuserfriend

Figure 8

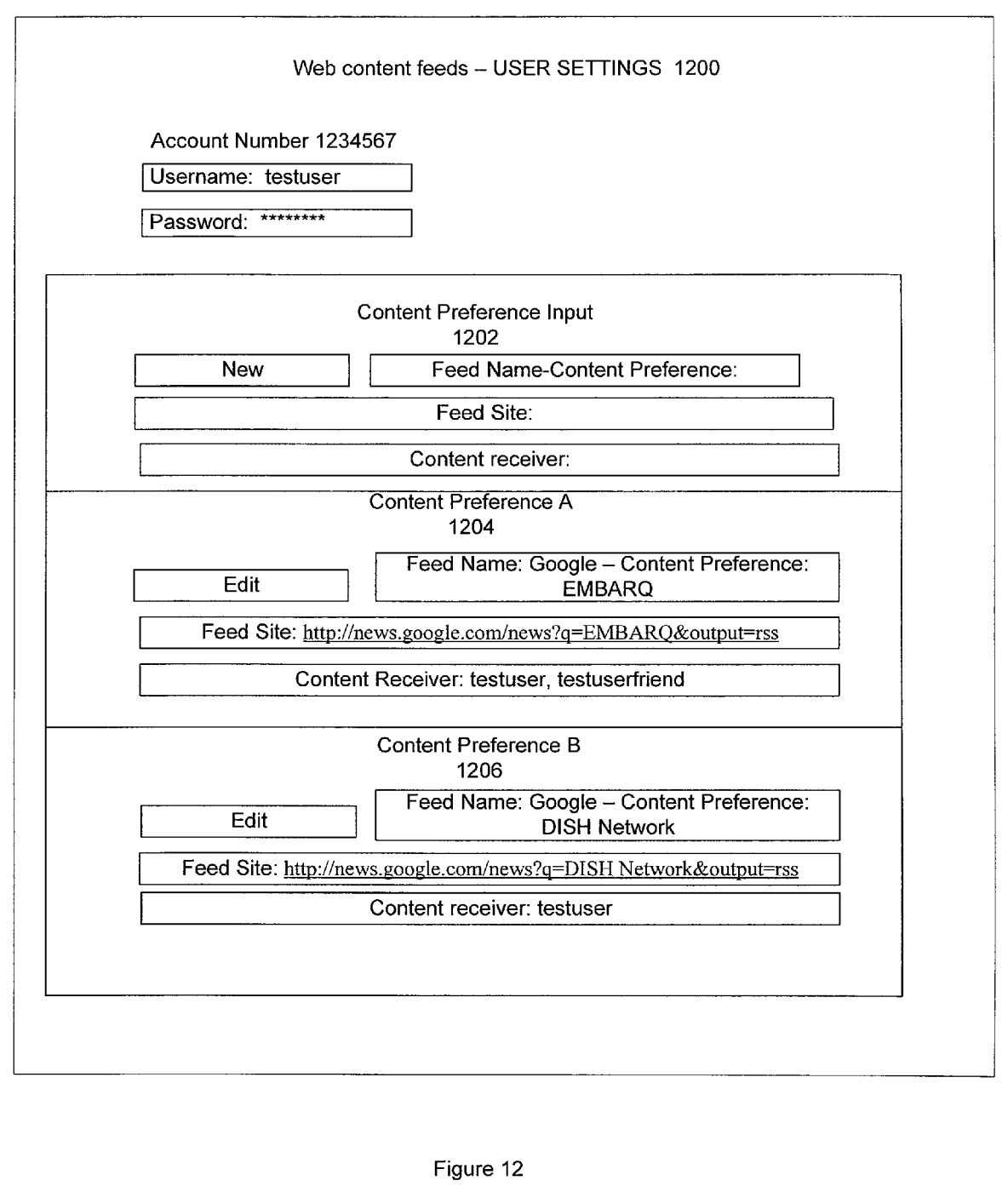

Web content feeds – USER SETTINGS 1200

Account Number 1234567

Username: testuser

Password: ********

Content Preference Input
1202

New

Feed Name-Content Preference:

Feed Site:

Content receiver:

Content Preference A
1204

Edit

Feed Name: Google – Content Preference: EMBARQ

Feed Site: http://news.google.com/news?q=EMBARQ&output=rss

Content Receiver: testuser, testuserfriend

Content Preference B
1206

Edit

Feed Name: Google – Content Preference: DISH Network

Feed Site: http://news.google.com/news?q=DISH Network&output=rss

Content receiver: testuser

Figure 12

METHOD AND SYSTEM FOR PROVIDING A REMINDER NOTIFICATION FOR A SET-TOP BOX

CROSS REFERENCE TO RELATED APPLICATION

The following are related applications which are being incorporated by reference in their entirety, U.S. application Ser. No. 12/201,313, filed Aug. 29, 2008, entitled "METHOD AND SYSTEM FOR PROVIDING A CONTENT NOTIFICATION FOR A SET-TOP BOX", U.S. application Ser. No. 12/201,397, filed Aug. 29, 2008, entitled "METHOD AND SYSTEM FOR PROVIDING A WEB-BASED CONTENT FEED FOR A SET-TOP BOX", U.S. application Ser. No. 12,201,273, filed Aug. 29, 2008, entitled "METHOD AND SYSTEM FOR COMMUNICATION WITH A SET-TOP BOX", U.S. application Ser. No. 12/201,436, filed Aug. 29, 2008, entitled "METHOD AND SYSTEM FOR PROVIDING A SOCIAL NOTIFICATION FOR A SET-TOP BOX", and U.S. application Ser. No. 12/201,162, filed Aug. 29, 2008, entitled "METHOD AND SYSTEM FOR PROVIDING USAGE INFORMATION FOR A SET-TOP BOX".

BACKGROUND

The use of communication networks has grown nearly exponentially in recent years. The growth can be attributed to greater reliability, protocols, and hardware available for improved communication networks. As such, users have come to expect better communication from home, work, and on the go. With the availability of improved communication networks, users desire the ability to communicate easily with other users and user appliances. Thus, there is a need to provide improved communication to users with the set-top box as well as with others through the use of a set-top box.

SUMMARY

A method and system for providing a reminder notification for a set-top box is disclosed. An embodiment is disclosed that determines a reminder notification rule for a recipient with at least one descriptor of media content received by a set-top box, queries a database for one or more selections of scheduled media content in accordance with the reminder notification rule, and sends a reminder notification to the recipient based on a query result. Another embodiment is disclosed that receives a request for a usage information of a set-top box in accordance with a reminder notification preference that has a reminder notification rule with at least one descriptor of media content received by a set-top box, and sends the usage information for the set-top box based upon the reminder notification preference.

BRIEF DESCRIPTION OF THE DRAWINGS

Illustrative embodiments of the present invention are described in detail below with reference to the attached drawing figures, which are incorporated by reference herein and wherein:

FIG. 5 depicts a user interface for implementing the provision of notifications in accordance with an embodiment of the present invention;

FIG. 8 depicts a user interface for implementing the provision of notifications in accordance with an embodiment of the present invention;

FIG. 12 depicts a user interface for implementing the provision of a web-based content feed in accordance with an embodiment of the present invention.

DETAILED DESCRIPTION

Figure 1:
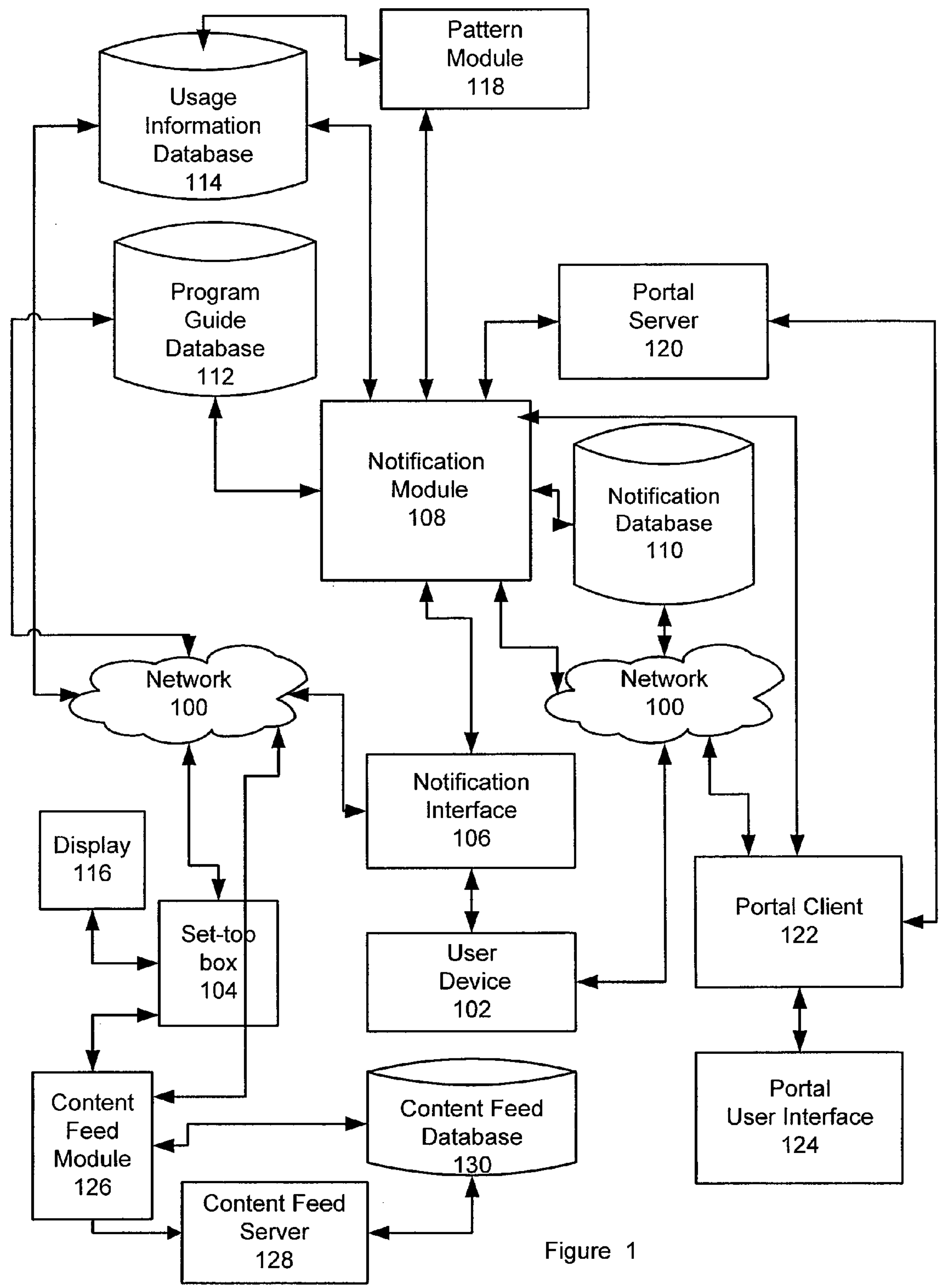
FIG. 1 depicts a system for implementing the provision of notifications for a set-top box in accordance with an embodiment of the present invention.

FIG. 1 depicts a system for implementing the provision of notification for a set-top box in accordance with an embodiment of the present invention. A network 100 is an infrastructure for sending and receiving signals and messages according to one or more designated formats, standards, or protocols. A network 100 may provide for both wired and wireless communication between the various elements of FIG. 1. Embodiments may rely on a network 100 for communication between elements as depicted, including, but not limited to, a user device 102, a set-top box 104, a notification interface 106, a notification module 108, a notification database 110, a program guide database 112, a usage information database 114, a display 116, a pattern module 118, a portal server 120, a portal client 122, a portal user interface 124, a content feed module 126, a content feed server 128, and a content feed database 130.

Any number of networks and service providers may be used to facilitate communication between the elements of FIG. 1. Examples of available implementations for a network 100 may include, but are not limited to, satellite, WiFi, WiMAX, global systems for mobile (GSM), time division multiple access (TDMA), code division multiple access (CDMA) wireless networks, and/or hardwired connections, such as fiber optics, T1, cable, DSL, high speed trunks, and public switched telephone network (PSTN) lines. Various protocols may be employed to allow for communication between the elements, such as TDMA, CDMA, GSM, personal communications systems (PCS), WiFi, WLAN, WiMAX, Hyper Text Transfer Protocol (HTTP), internet protocol suites (e.g., Transmission Control Protocol (TCP) and the Internet Protocol (IP)), Voice-over-Internet protocol (VoIP) or other frequently used voice and data communications protocols and standards.

A network 100 may provide the capability for a user device 102 to receive and/or send notifications concerning a set-top box 104. A user device 102 allows for data and/or voice communication over a network. Embodiments of a set-top box 104 are described in this application with FIG. 2. User devices 102 may include, but are not limited to, mobile devices, smart phones, cellular phones, Blackberry® devices, personal digital assistances (PDA), mp3 players, laptops, computer systems, evolution data optimized (EDO) cards, multi-mode devices, and other communication devices and elements.

A notification interface 106 may allow for the communication between a notification module 108 and a user device 102. In one or more embodiments, the notification interface 106 may be implemented as a piece of software to allow for sending and receiving notifications at the user device 102. The notification interface 106 may allow for communication between the user device 102 and/or set-top box 104 and the notification module 108 without requiring the notification module 108 to be aware of the internal operation of the user device 102. The notification interface 106 may be implemented with one or more communication protocols, including but not limited to, instant messaging, Short Message Service (SMS), and email. In some embodiments, the notification interface 106 may support interactive voice response (IVR) systems.

The notification module 108 may retrieve information to create notifications from one or more databases or collections of data. Implementations of a database may include, but is not limited to, relational database(s), object-oriented database(s), and file system(s). The notification module 108 may create notifications in accordance with defined notification preferences for one or more set-top boxes 104. In one or more embodiments, a notification module 108 retrieves notification preferences from a notification database 110. The notification database 110 may store various types of notification preferences concerning a set-top box 104, such as reminder notification and content notification preferences.

A notification preference may have one or more notification preference rules to indicate a user's preferences on receiving and/or sending notifications. A user may create a content notification rule to send and/or display a notification to a recipient with an email address, a phone number, a group in a social network, an address for a set-top box 104, a portal, or any other device implementing a notification interface 106. A notification may include, but is not limited to, an email, a text message, a voicemail message, or any other type of communication.

To provide content reminder and content notification information for notifications, a notification module 108 may rely on program guide information in some embodiments. A program guide database 112 may store program guide information, and program guide information may encompass any information about scheduled broadcast of media content, such as times, titles, genre, program summary, content retrieval mechanisms, and channel. Media content is any audio and/or visual content that may be received by a set-top box 104.

A usage information database 114 may store usage information for a set-top box 104 or a particular user thereof Usage information may indicate media content received and/or selected for display at a set-top box 104 or a particular user thereof. A usage information database 114 may service a request for retrieval of usage information by the notification module 108 and the notification interface 106. Usage information may be a list or a history for any length of time for media content received and/or selected for display at a set-top box 104. The notification module 108 may create notifications in accordance with notification preferences using the usage information for a set-top box 104. In one or more embodiments, the usage information database 114 may store usage information regarding all media content selected at a set-top box 104 for display, recording, and storage. The media content selected at a set-top box 104 may be displayed on any type of display 116, such as a television or monitor. Some embodiments may utilize the usage information on a plurality of set-top boxes 104. For example, a user may define a notification preference for information on media content received by friends in a social network or community.

A pattern module 118 may be used by a notification module 108 to identify patterns in the usage of one or more set-top boxes 104. For example, users may set up a content notification preference to monitor the content received by friends in a social network and request that a notification be sent to the user when a sports television station is currently being watched by one or more friends. The pattern module 118 may also be used to identify patterns in the usage information of a single set-top box 104. For example, a pattern identified in the usage information may indicate the type of content received at a set-top box during certain times of the day.

In one or more embodiments, users may request that recipients receive notifications at a portal server 120. The portal server 120 may be implemented on a computer system and may accept various network connections to receive and service notification requests with the notification module 108. The notification module 108 may be a software application installed on the portal server 120 and/or the portal server 120 may forward or send requests to any number of servers that implement the functionality of the notification module 108. A user may use a portal to access the portal server 120 and send requests for notifications with a portal client 122. A portal may be a web site that functions as a central point of access to information on the Internet. The portal may be implemented as a software application running on a portal server 120 and/or a portal client 122 that is accessed via a web browser over a network such as the Internet or an intranet. The portal may be accessed from any computing system and/or user device to enable communication with or concerning a set-top box 104. Users may send requests for notifications on a portal client 122 using a portal user interface 124 for the portal. Although FIG. 1 depicts a client-server software architecture for enabling communication with a set-top box, there are many computer system architectures that may support communication with a set-top box, including, but not limited to, peer-to-peer architectures, n-tier architectures, using an application server, and any other distributed system architectures.

In one or more embodiments, a content feed module 126 may be software running on a content feed server 128 that services requests for content feeds from a content feed database 130. The content feed module 126 may access program guide information at a program guide database 112 to identify scheduled programs that are related to content contained in content feeds. The content feed module 126 may provide television content identifiers for television programs related to a content feed so that links to such television programs may be incorporated in the content feed or presented to a subscriber of a content feed on a display 116. The content feed database 130 may store content feeds from content feed sources subscribed to by a user. The content feeds stored in the content feed database 130 may be acquired from a content source either on a push or pull technology basis or any combination thereof. For example, the content feed module 126 may request or "pull" updated content from a server for a content feed source and/or a content feed source may "push" updated content without a request being sent to a server.

Figure 2:
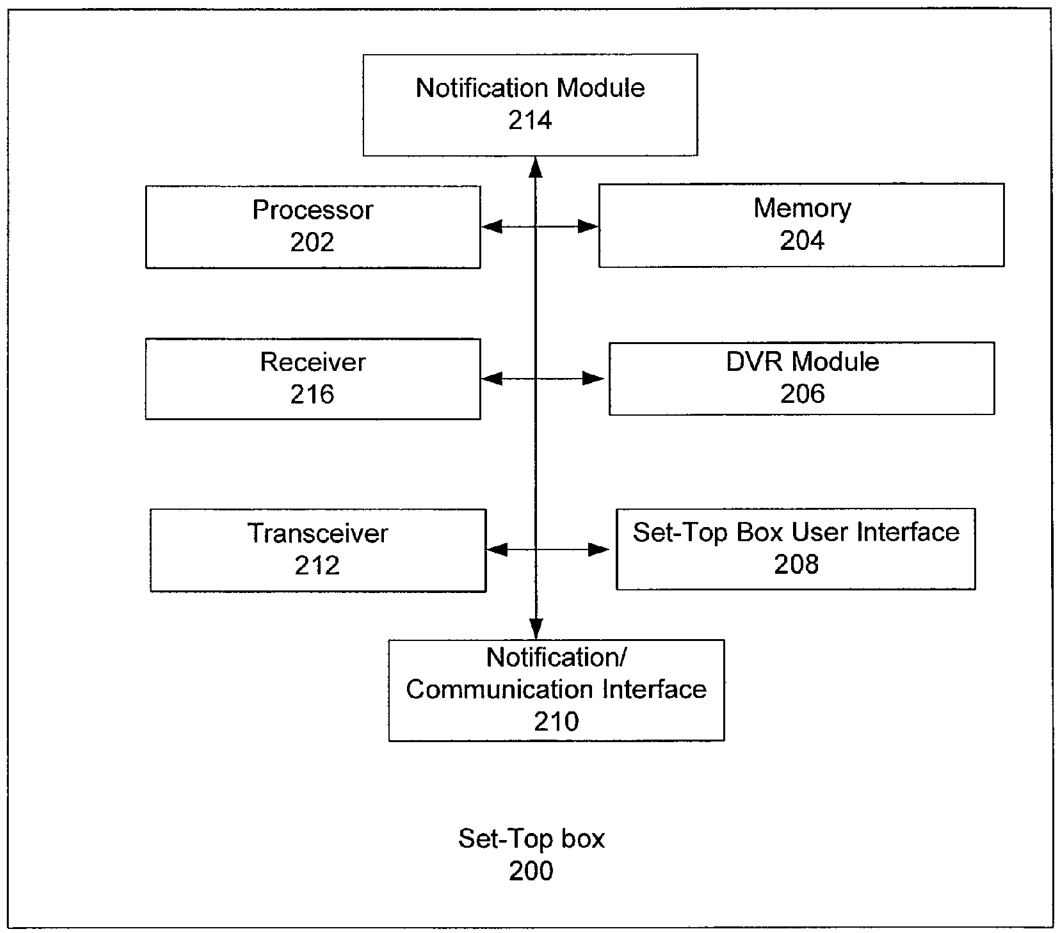
FIG. 2 depicts a set-top box for implementing the provision of notifications for a set-top box in accordance with an embodiment of the present invention.

FIG. 2 depicts a set-top box for implementing the provision of notifications in accordance with an embodiment of the present invention. The set-top box 200 may include, but is not limited to, the following elements: processor 202, memory 204, receiver 216, Digital Video Recorder (DVR) module 206, user interface 208, Notification/Communication Interface 210, notification module 214, and transceiver 212. The set-top box may communicate with various elements of the system described in FIG. 1 over a network 100. The elements of the set-top box 200 itself may communicate through any number of busses, cards, connectors, jumpers, networks, or other connection elements. The components and description for the set-top box 200 may be similarly applicable to a user device, television, or network device operated by a communications service provider.

The processor 202 is circuitry or logic enabled to control execution of a set of instructions. The processor 202 may be a microprocessor, digital signal processor (DSP), central processing unit, application-specific integrated circuit (ASIC), or other device suitable for controlling an electronic device. The processor 202 may have one or more hardware and software elements that execute software instructions, programs, and applications, converting and processing signals and information, and performing other related tasks. The processor 202 may be a single processor or a combination of processors integrated with other computing or communications elements.

The memory 204 is a hardware element, device, or recording medium configured to store data for subsequent retrieval or access. The memory 204 may be static or dynamic memory. The memory 204 may include a hard disk, random access memory (RAM), cache, removable media drive, mass storage, or configuration suitable as storage for data, instructions, and information. In one embodiment, the memory 204 and processor 202 may be integrated. The memory 204 may use any type of volatile or non-volatile storage techniques and mediums. The memory 204 may store or queue communications, notifications, or messages that are received or to be sent. For example, the memory 204 may store all notifications, messages or communications that are received or sent by the set-top box 200, and allow for display of the notifications on an interconnected television, monitor, or other user device.

The receiver 216 and DVR module 206 are elements of the set-top box 200 that manage the receipt, storage and playback of media content. The receiver 216 and DVR module 206 may be implemented as any combination of hardware and/or software that may be configured through the set-top box user interface 208. The media content received by the set-top box 200 may include, but is not limited to, content feeds, television programs, video on demand (VOD), real-time events, video clips, photographs, web pages, interactive content, or other media content. The set-top box 200 may also include a notification/communication interface 210 to control the receipt, storage, and playback of media content as well as send and receive notifications or communications. In one or more embodiments, the notification/communication interface 210 may be implemented to provide any of the functionality described above with the notification interface 106 in FIG. 1.

The set-top box user interface 208 is an interface that allows a user to interact with the set-top box 200. Set-top box user interface 208 may be an interactive menu displayed onto a television or other display to allow a user to control the functionality provided by the set-top box. In another embodiment, the set-top box user interface 208 may control an interactive voice response system for presenting the user with various options and receiving user input.

The set-top box 200 may include a transceiver 212 to enable the transmittal and receipt of commands, signals, media content, information, messages, and other data through a wired or wireless connection. The transceiver 212 may utilize TCP/IP, Signaling System #7 (SS7), Bluetooth, WiFi, ethernet, or other signals, protocols, formats, or message types to communicate with other devices.

The notification module 214 may communicate with other elements to provide usage information for the set-top box 200. Any change of media content or receipt of media content at the set-top box 200 may be communicated to a user or stored at a database. The notification module 214 may be implemented as any combination of software and/or hardware. In one or more embodiments, the notification module 214 of the set-top box 200 may provide a portion of the functionality described above with the notification module 108 in FIG. 1. For example, the notification module 214 may provide notifications directly to user devices.

Figure 3:
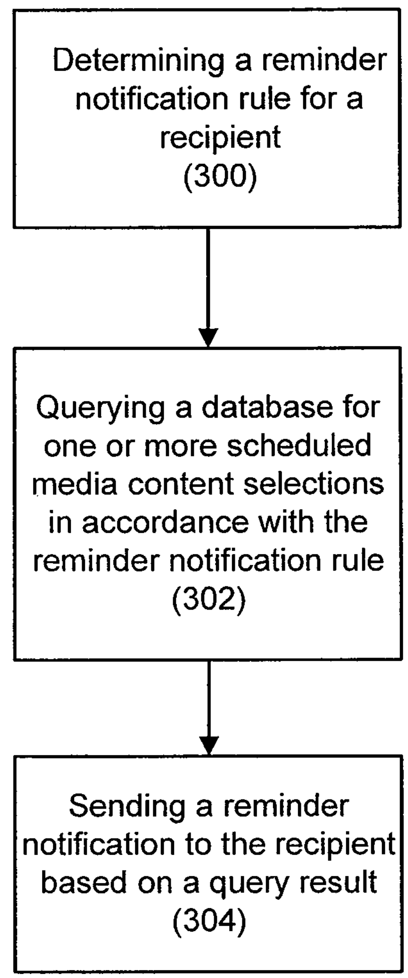
FIG. 3 is a flow chart for implementing the provision of notifications in accordance with an embodiment of the present invention.

FIG. 3 is a flow chart for implementing the provision of reminder notifications in accordance with an embodiment of the present invention. A reminder notification is a type of notification that serves a reminder to a recipient that media content specified in a reminder notification rule may be accessed. In one or more embodiments, the provision of reminder notifications is implemented as a set of instructions that are executed on any combination of the following: a server, a client, and/or a set-top box. Initially, a reminder notification rule for a recipient may be determined (300). A reminder notification rule may be determined by retrieving the reminder notification rule from a database or any other form of computer data storage. The reminder notification rule may be received directly from a user with the use of a notification interface 106. Another embodiment may have a user create a reminder notification rule with a user interface, such as the notification interface 106 or the portal user interface 124.

A reminder notification preference may consist of one or more reminder notification rules. A reminder notification rule may have one or more descriptors for media content including, but not limited to, a broadcast time, a content category (e.g., drama, comedy, sports, pay-per view, sitcom, movie, etc.), a particular actor, director or producer, a content type (e.g., web page, television broadcast, etc.), a television station, a title, or any keyword that allows for the identification of media content. In one or more embodiments, the reminder notification rule may have a descriptor for media content that relies on the usage information for any number of set-top boxes. For example, a user may create a reminder notification rule to receive a notification for any sitcom episode broadcast during primetime viewing hours that has not been selected to be displayed or stored by a group of set-top boxes according to the usage information collected on the group of set-top boxes.

Next, a database may be queried for one or more selections of scheduled media content in accordance with the reminder notification rule(s) (302). Any number of databases may be queried to satisfy the reminder notification rule(s) for a notification preference, such as a usage information database 114, a program guide database 112, a notification database 110, a metadata database, a media content database, a web index, a file system, or any database that facilitates access to media content. A scheduled media content selection is media content that is scheduled to be available for selection at a set-top box 104. The media content may be already available for selection at a set-top box 104 or may be scheduled to be available at a later date. In one or more embodiments, a query for scheduled media content selections will return any number of address(es), link(s) to access the media content, television station(s), or any information on how to receive the media content.

A reminder notification may then be sent to any number of recipients based on the query result (304). A user may create a reminder notification rule to send content to a recipient with an email address, a phone number, a group in a social network, an address for a set-top box 104, a portal, or any device implementing a notification interface 106. Alternatively, the query results may indicate that a reminder notification does not have to be sent. The content of reminder notification may be determined by a user or the notification may indicate that reminders or stored content is waiting for retrieval. In one or more embodiments, a user may request that reminder notifications be directly inserted into a calendar in a scheduling/calendaring software application.

Figure 4:
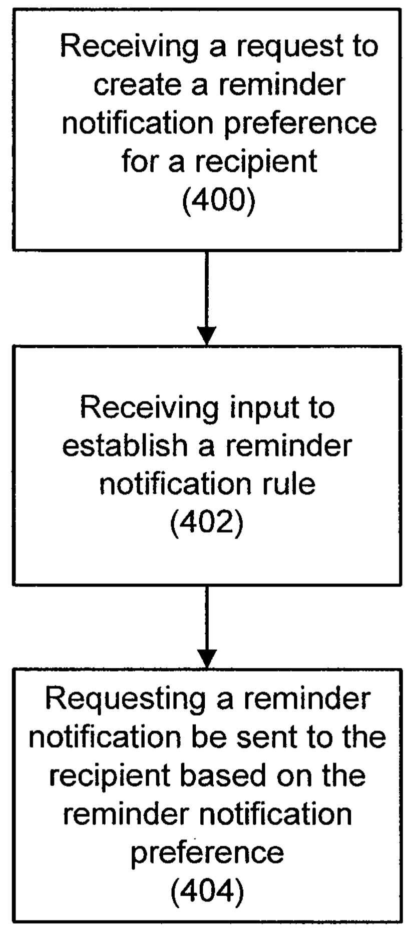
FIG. 4 is a flow chart for implementing the provision of notifications in accordance with an embodiment of the present invention.

FIG. 4 is a flow chart for implementing the provision of notifications in accordance with an embodiment of the present invention. Initially, a request is received to create a reminder notification preference for a recipient (400). In some embodiments, a user may send a request to create a reminder notification preference by using a portal, such as with the submittal of a form or any input method available on a web page of a portal. In one or more embodiments, the request for a reminder notification may be a response to a previous notification for the user and the reminder notification preference or a reminder notification rule may be created from the earlier notification. For example, if the user received a reminder notification that media content of interest to the user was scheduled to be broadcast that evening, then the user could send a request to receive a reminder notification for the next broadcast of the media content and the notification module 108 could use the earlier reminder notification to create one or more reminder notification rules.

Next, input to establish a reminder notification rule is received (402). Input to establish a reminder notification rule may be input by using a portal. In one or more embodiments, input options to establish rules may be provided by a third party to a user and the user may select that the third party establish rules for reminder notifications received by the user. For example, a user may subscribe to receive reminder notifications from a third-party that reviews media content and allow the third-party to establish rules for their set-top box.

After a reminder notification rule is established, a request is made to have reminders sent to the recipient based on the reminder notification preference (404). In one or more embodiments, a request is received at a notification module 108 to send a reminder notification in accordance with a reminder notification preference. Reminder notification preferences and reminder notification rules may be stored in a notification database 110 for retrieval by the notification module 108. In some embodiments, a notification module 108 may determine if a recipient has requested not to receive reminder notifications and will allow a reminder notification to be sent to the recipient.

Figure 5:
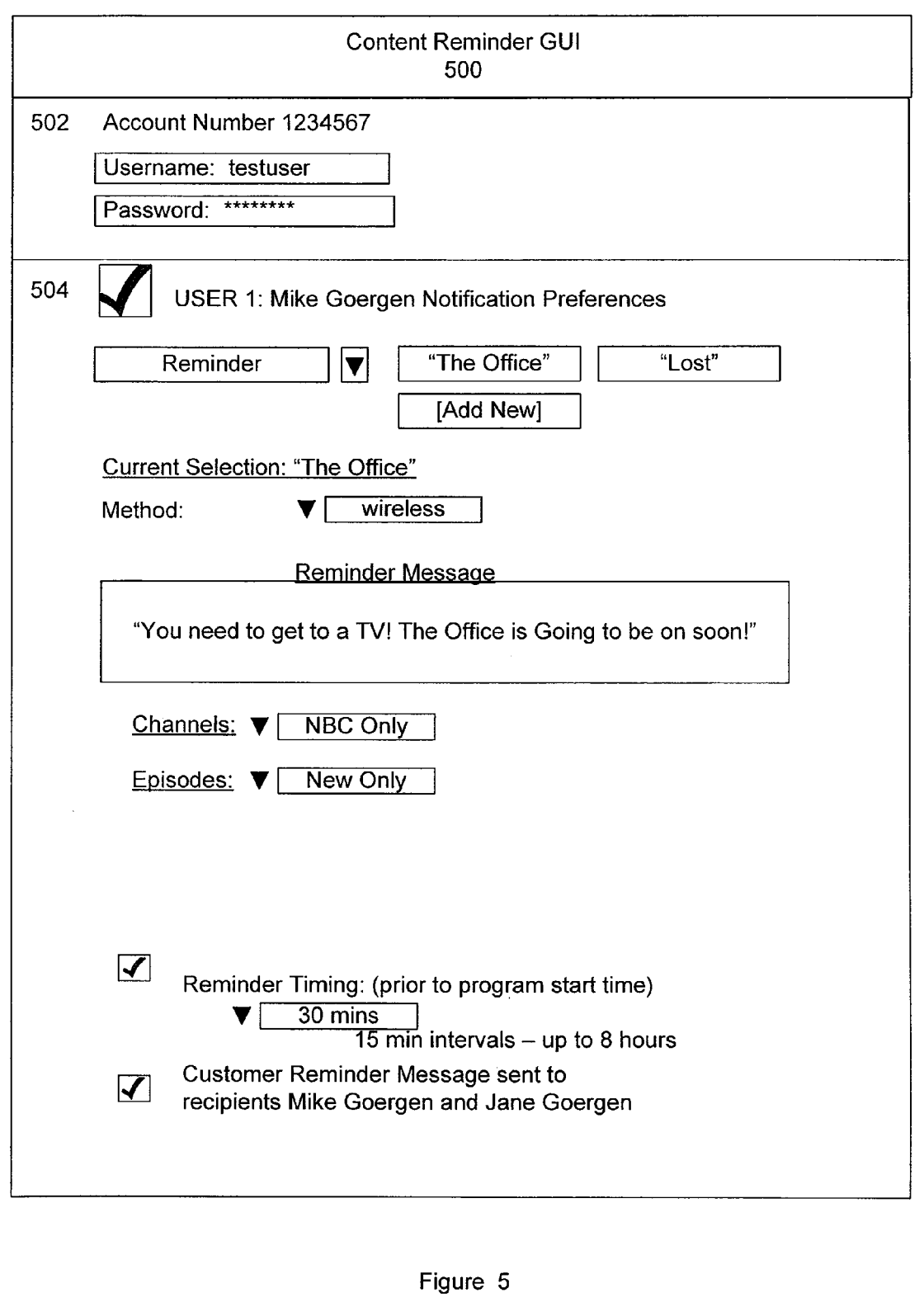

FIG. 5 depicts a user interface for implementing the provision of notifications in accordance with an embodiment of the present invention. In FIG. 5, a reminder notification user interface entitled "Content Reminder GUI" 500 is provided as an example of an interface for the present invention. It will be understood by those with skill in the art that any number of interfaces may be provided to create, delete, and update reminder notifications. Embodiments of the present invention may request that security information be input in order to create reminder notifications, such as a username and password as shown for "Account Number 1234567" in FIG. 5. The following examples of input for creating reminder notification preferences and the corresponding reminder notification rules are depicted with 504: a drop down menu for the type of notification to be received with "Reminder" selected, text inputs for title descriptors for media content with "The Office" and "Lost" selected, a drop down menu for the method of receiving notifications with "wireless" selected, a text input for the reminder notification with "You need to get to a TV! The Office is going to be on soon!" selected, a drop down menu for a channel descriptor with "NBC Only" selected, a drop down menu for text descriptor for episodes with "New Only" selected, a drop down menu for text descriptor for timing with "30 mins" selected, and a text input for the recipients of the notifications with "Mike Goergen and Jane Goergen" selected. In one or more embodiments, a phone number, an address, or other contact information may be input to ensure that a recipient receives the notification.

Figure 6:
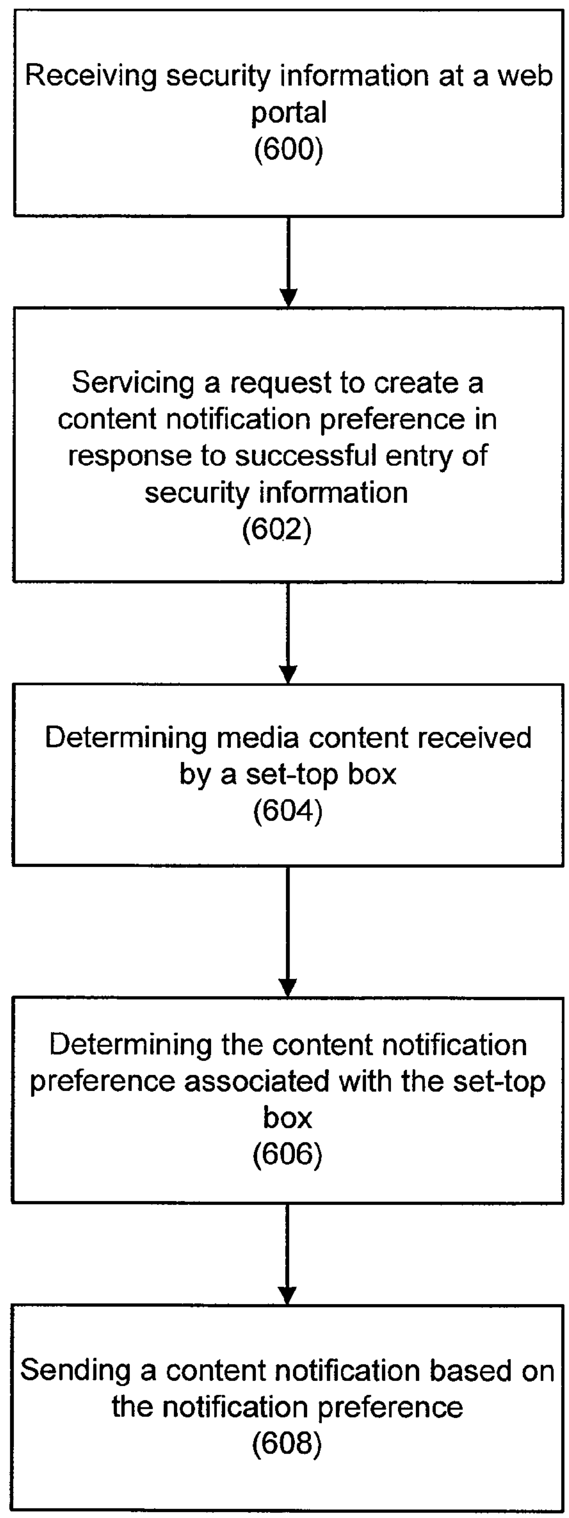
FIG. 6 is a flow chart for implementing the provision of notifications in accordance with an embodiment of the present invention.

FIG. 6 is a flow chart for implementing the provision of notifications in accordance with an embodiment of the present invention. Initially, security information is received (600). Security information may be input at a web portal in some embodiments. The security information allows for the identification of a user authorized to establish rules for receiving notifications regarding the assigned set-top box. In one or more embodiments, the security information includes identification information for a user that has been assigned the set-top box, such as a username and password associated with the set-top box. The identification information may include account information that uniquely identifies a user, a set-top box owner, or a subscriber who receives media content with a set-top box. The security information may be any security mechanism that ensures that an owner of a set-top box controls all content notifications for the set-top box. For example, the set-top box owner may prefer that content notifications and usage information only be retained during times that the set-top box owner is not supervising use of the set-top box.

Next, a request to create a content notification preference for the set-top box is serviced (602). A content notification preference may have one or more content notification rules. A content notification rule may indicate how media content for a set-top box should be monitored. The request to create a content notification preference may be serviced in response to successful entry of security information. Successful entry of security information may ensure that only authorized users are able to create notification preferences and that unauthorized notifications are not sent to recipients. In one or more embodiments, the security information may be input by a user at a web portal. Alternatively, unsuccessful entry of security information may result in denial of the request to create a content notification preference.

Servicing a request to create a content notification preference may entail creating one or more content notification rules. For example, a content notification preference may have a content notification rule specifying that a recipient be alerted when media content received on a set-top box is pay-per view content. The content notification rules may be input with a user interface, such as the notification interface 106 or the portal user interface 124. A content notification preference and corresponding content notification rules may be updated using a user interface. The content notification preference may be updated by retrieving a current version of a content notification preference from a database or any other form of computer data storage and updating the content notification preference with the new input for the content notification preference. A content notification rule may be received directly from a user with the use of a notification interface 106. For example, a user may send an instant message with a content notification rule to monitor a set-top box for receipt of media content selected from channel 5.

Next, the media content received by a set-top box is determined (604). The media content may have been selected for display or recorded and saved to the set-top box. In one or more embodiments, a usage information database 114 is accessed to determine the media content received by a set-top box. The usage information may also be retrieved from memory 204 at the set-top box 200. The storage of usage information will be described in further detail below with FIG. 7.

After media content received by a set-top box is determined, a content notification preference associated with the set-top box is determined (606). The content notification preference includes one or more content notification rules to monitor media content received by a set-top box. A content notification rule may be determined by retrieving the content notification rule from a database or any other form of computer data storage. The content notification rule may be received directly from a user with the use of a notification interface 106.

Another embodiment may have a user create a reminder notification rule with a user interface, such as the notification interface 106 or the portal user interface 124. A user may make requests with the interface for creation of a content notification preference. The content notification rule may be established from input received through a user interface to create the content notification preference. For example, the user may input information in a form on a web portal in order to create a content notification rule.

The content notification rules may provide that media content for a set-top box be monitored in ways including, but not limited to, the following: during a certain time of day, a content rating (e.g., R, PG-13, etc.), a content descriptor, a set-top box identification number, and/or a duration of time. A user may desire to monitor the frequency that a set-top box is viewed on any given day or a user may desire to monitor a set-top box in a child's room. Those skilled in the art will recognize that there are any number of rules that can be provided to the user as options for monitoring content at a set-top box.

After the content notification preference is determined, a notification is sent to a recipient based on the content notification preference (608). In one or more embodiments, the provision of content notifications is implemented as a set of instructions that are executed on any combination of the following: a server, a client, and/or a set-top box. A user may create a content notification rule to send a notification to a recipient with an email address, a phone number, a group in a social network, an address for a set-top box 104, a portal, or any device implementing a notification interface 106. Alternatively, a content notification rule may indicate that a content notification does not have to be sent. The information provided in the content notification may follow a standard template or may be completely customizable by a user.

One embodiment of the present invention combines notifications for set-top boxes with social networks. A social network is any community of people who share interests and activities, or who are interested in exploring the interests and activities of others. A social network website provides a variety of ways for users within the network to interact, such as email or SMS. Social network members may permit one or more other social network members access to their usage information for set-top boxes. A social network member that has access to the usage information for another member may create notification preferences and the corresponding notification rules to monitor the media content received at member set-top boxes. A social notification preference may be one or more social notification rules to allow for creation of social notifications to be sent to or received by members of a social network. A social notification is any type of notification that may be sent to members of a social network. A social network member that has access to the usage information for another member may create notification preferences and the corresponding notification rules to receive reminder notifications for content that is of interest to one or more other members. For example, a user may create a content notification rule to receive a content notification when one or more friends that are members of a social network are watching a sports game on ESPN.

Notifications may be sent to social network members in accordance with the notification preferences. Embodiments may utilize the available communication options within the social network and send notifications to recipients through the social network. Notifications may be sent to members of social networks with recipient information provided with the notification preference. Notifications may also be published on the community website for members of the social network with similar interests.

Although reminder and content notifications are described as different types of notifications, the functionality for reminder and content notifications may be applied in combination. For example, a user may request to receive a content monitoring notification for media content selected at set-top boxes by a majority of friends in a social network, and request to receive a content reminder each time the media content identified in a content monitoring notification is scheduled for broadcast.

Figure 7:
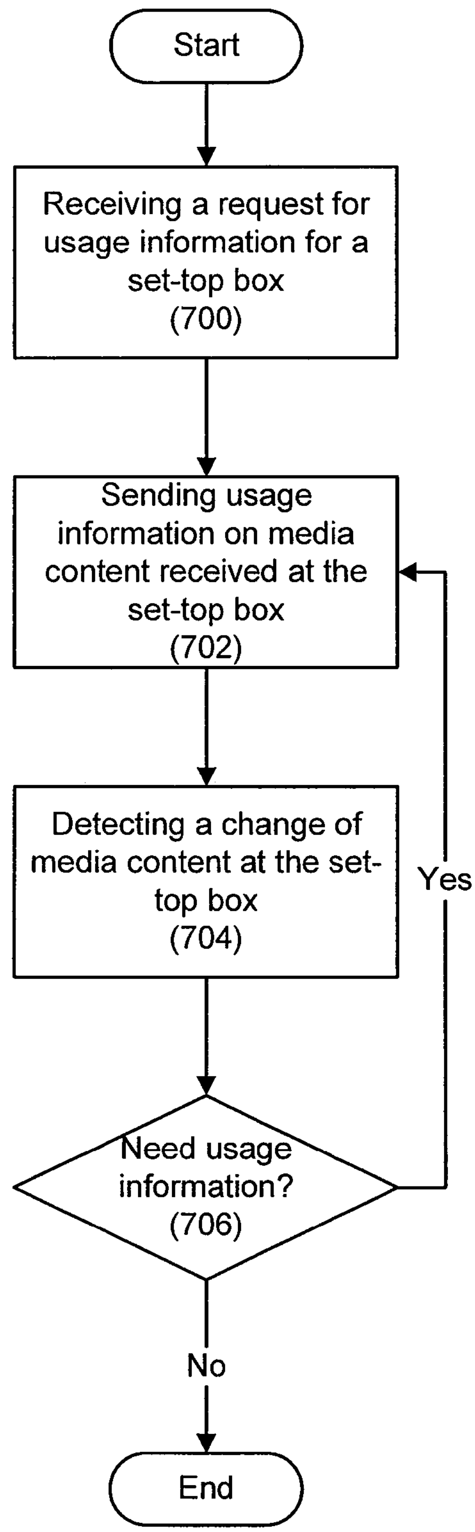
FIG. 7 is a flow chart for implementing the provision of usage information in accordance with an embodiment of the present invention.

FIG. 7 is a flow chart for implementing the provision of usage information in accordance with an embodiment of the present invention. In one or more embodiments, the provision of usage information is implemented as a set of instructions that are executed on any combination of the following: a server, a client, and/or a set-top box. Initially, a request for usage information for a set-top box is received (700). The request for usage information may concern managing or querying a usage information database 114. The request may indicate that usage information for the set-top box should be retrieved and/or stored in a database for later retrieval, such as the usage information database 114. The request for storage/retrieval of usage information may be sent by a user through the use of a web portal, a user device 102, or from the notification module 108. The request may indicate that usage information for the set-top box should begin to be or resume being stored at a database or in memory at a set-top box.

In one or more embodiments, the request for usage information may be a query for the usage information stored at the usage information database 114. The query may be written in any database query and/or database management language, such as Structured Query Language (SQL). A query may have criteria for data retrieved from a database. For example, a query for the database may specify that usage information for a set-top box for a particular date be retrieved with "Select* from SetTopBoxAInfo where date='04102008'." A query result from the query may be a Boolean value, a number of rows, or any data structure providing a result set for row(s) from a table in the database that meets the criteria of the query. Criteria for a query of the database may include, but is not limited to, a user, a show type, a date, commonly watched television shows, a keyword, an actor's name, an episode, a count for the time spent watching media content, a value for a column in a database table, a column in a database table, a table in a database, and a keyword. The usage information database 114 may aggregate usage information from a plurality of set-top boxes. The usage information database 114 may store information under user profiles to differentiate usage information for a plurality of users such as, for example, the members of a household in response to detected viewing patterns, a user identifier, or other behavior or information enabling a set-top box to determine the identity of a user. In such a manner, a set-top box may automatically determine which user profile to update with usage information. In one embodiment, a "household profile" or other combined profile may be used to aggregate and track the overall use of all viewers of one or more set-top boxes. Usage information database 114 may also interface with Internet websites, electronic television guides, or a cable provider's program guide to obtain additional information associated with particular usage information. For example, usage information database 114 may populate database fields with additional information regarding the television shows viewed based on additional information available on the Internet that is not otherwise available on the set-top box. In one embodiment, predetermined or user-definable query buttons may be utilized. For example, a "missed episodes" query button may be utilized and selected to display to a viewer those episodes of all of or a particular one of a viewer's favorite shows that the viewer has not yet viewed or recorded. For further example, a "favorite actor" query button may be utilized to display all upcoming movie broadcasts included in a program guide that include all of or one of the favorite actors of a viewer, as previously indicated by such user or as automatically determined from a viewer's usage information. The results of a query may be sent to a user device 102, portal client 122, or set-top box 104.

Next, usage information on media content received at the set-top box is sent (702). The usage information may be sent (702) to a database in order to store the usage information for subsequent retrieval. The usage information may be sent (702) in the form of a query result to be viewed at a user device and/or a portal. The usage information may be retrieved from a usage information database 114 or sent directly from the set-top box 104 as requested. The request may indicate that a user desires that the usage information be retrieved in accordance with a notification preference, and a response to the request may be limited to usage information that falls into a particular category of media content. A pattern module 118 may be used to determine patterns in the usage information to provide information to a user on patterns of content received by a particular set-top box.

A change of media content received at a set-top box and/or displayed at the set-top box may be detected (704). Information regarding the change may be delivered in real-time directly from the set-top box 104. The notification module 108 may need the delivery of usage information in real-time in order to provide accurate notifications to recipients. The change in media content may be needed to fulfill a request (706) and the usage information on the media content is sent in accordance with a request (702). In one or more embodiments, the change in media is sent to a usage information database to ensure that the set-top box usage information is stored.

In one or mote embodiments, a notification preference may need the usage information (706) and the usage information for the change in the media content may be sent (702). The usage information may be sent directly to the user in a notification and/or sent to a usage information database 114 for storage (702).

Alternatively, the usage information (706) may not be retained. For example, a set-top box owner may request that no usage information be stored for the set-top box or that only a select portion of usage information be stored. The usage information database 114 may be configured to aggregate information from multiple set-top boxes. The usage information database 114 may aggregate information for a family, a business, a communications service provider, an organization, or any other entity. In an embodiment, a user may be required to grant authorization for a communications service provider or other external organization to aggregate user information. The usage information database 114 may aggregate usage and viewing information based on options, settings, and any other user preferences. For example, the user preferences may specify that viewing information is recorded only for children within a home from 3:30 p.m. to 12:00 p.m. and the viewing information is automatically displayed to a parent on one or more specified days or times. In another embodiment, the viewing information may be automatically sent in a message, such as an email or text message to a specified device or posted to a user accessible website.

The usage information database 114 may store information for multiple user profiles. The viewing information may be tracked individually, for groups of individuals, and/or collectively. For example, the set-top boxes may be utilized by various family members in different locations within a home with the set-top boxes communicating viewing information to one or more of the set-top boxes. The identity of a user may be determined based on viewing patterns and selection or other user behavior or information. In another embodiment, a user may input a password, a name, a pin, any other user identifier and/or identification information. A remote control may also be configured to read a biometric, such as a fingerprint, to determine the user accessing and controlling a specific set-top box.

The usage information database 114 may track viewing information for any number of topics or contacts. In one embodiment, the usage information database 114 may track the favorite or most frequently viewed programs, ratings, channels, actors, series, and other information. The usage information database 114 may interface with Internet websites, electronic television guides, a cable provider's program guide to obtain additional information associated with user viewing information. For example, an external television database may be accessed by the usage information database 114 to extract additional information, such as actors, directors, and rating. The usage information database 114 may also extract interactive content or information of interest to a user that is not available through the set-top box, such as actor biographies, quizzes, product placements, and other information. The usage information database 114 may also be configured to track categories or types of viewer content. The types or categories of viewer content may include educational, movies, cartoons, dramas, comedies, action, nature, horror, and other similar topics.

The viewing information within the usage information database 114 may be tracked for specific time periods, such as per day, week, month, and year. As a result, a summary or history of selected viewing information may be displayed to one or more authorized users for a specified time period. In another embodiment, a user may track viewing information for a time period, such as winter vacation, the school year, or three specific days.

The usage information database 114 may compile information regarding episodes, movies, and series watched by the user. The usage information database 114 may communicate with a DVR integrated with or external to the set-top box to record specified information. The usage information database 114 may interact with a program guide to record content or provide the users content reminders. The content reminders may be output through a display or sent in a message from the set-top box. The usage information database 114 may interact with the DVR to perform a smart DVR function of automatically recording missed episodes, programs, or movies that the user has not viewed. As a result, the user may be able to watch movie sequels the user has not previously seen based on the compilation of viewing information through the usage information database 114 and interactivity of the DVR. In one embodiment, missed episodes may also be queried by a user to display upcoming television broadcasts included in a program guide that are unwatched by the user. Any number of criteria or factors may be utilized to record content that may be of interest to one or more users. The usage information database 114 may specify the content that was automatically recorded for a user and what factors prompted the usage information database 114 to command the DVR to record the content. Any number of automatic selection elements, content, or interactive features may be utilized to access the viewing information stored for multiple users within the usage information database 114.

In one embodiment, the user may select to review viewing information based on a specific date or time period. A calendar interface may visual display viewing information for each day, week, month, or year. For example, the user may select to view movies and televisions reviewed during a fall break to recommend a movie to a friend. The viewing information may also be shared with a friend or other authorized user based on permissions or an invitation.

In one or more embodiments, usage information stored in a usage information database 114, as described with FIG. 7, may be displayed on a web portal. A user of a web portal may personalize their web portal to display usage information for one or more set-top boxes. The usage information may have information on all content received and/or selected for display at a set-top box, including, but not limited to, time received/displayed, set-top identification, title of content, type of content, ratings for content, program guide information, television episode information, and any information regarding the content. The user may choose to view the usage information that pertains to any notification or notification preferences and/or patterns identified in viewing habits.

FIG. 8 depicts a user interface for implementing the provision of notifications in accordance with an embodiment of the present invention. In FIG. 8, a reminder notification user interface entitled "Content Notification—User Settings" 800 is provided as an example of an interface for the present invention. It will be understood by those with skill in the art that any number of interfaces may be provided to create, delete, and update content notifications. Embodiments of the present invention may request that security information be input in order to create reminder notifications, such as a username and password as shown for "Account Number 1234567" in FIG. 8. The following ways to provide input for creating content notification preferences and corresponding content notification rules are depicted 802: a text input for a notification preference entitled "Name-Notification Preference," a text input for a notification rule entitled "Notification Rule," and a text input for a recipient entitled "Notification Receiver." Examples of ways to provide input to edit notification preferences are depicted 804 and 806: a text input for a notification preference entitled "Name-Notification Preference," a text input for a notification rule entitled "Notification Rule," a text input for identification of a set-top box entitled "Set-top Box," a text input for time entitled "Time," and a text input for a recipient entitled "Notification Receiver."

Figure 9:
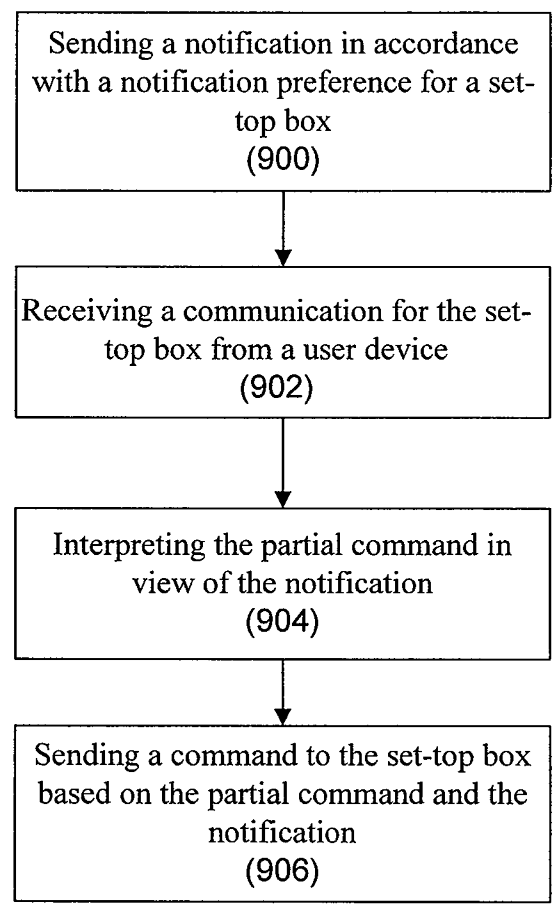
FIG. 9 is a flow chart for implementing the provision of responses to notifications in accordance with an embodiment of the present invention.

FIG. 9 is a flow chart for implementing the provision of responses to notifications in accordance with an embodiment of the present invention. Initially, a notification is sent in accordance with a notification preference for a set-top box (900). In one or mote embodiments, the notification preferences are reminder notification preferences as described above with FIGS. 3 and 4 and/or content notification preferences as described above with FIG. 6. The notification may contain information to allow for interpretation of a partial command, such as information on media content available to be received by the set-top box. A user may receive the notification at a user device and send a communication with a partial command in response to the notification to perform commands relating to the notification. A partial command may be a text string that is interpreted with a notification to be a command for a set-top box. For example, a user may send a text message with a partial command as follows, "R Office" and the text message combined with a reminder notification as follows, "The 'Office' television show episode that has not been received for viewing by set-top box A will be broadcast in 15 minutes," the text message can be interpreted to record the Office episode in 15 minutes on set-top box A. A user may leave a voice message for the set-top box that is converted into the following text "S R." The partial command "S R" combined with the following content notification "Recording of R rated movie began on set-top box B" may be interpreted to be a command to stop the recording of the R rated movie.

Next, a communication with a partial command for a set-top box is received from a user device (902). A user device, such as user device 102, may use a Notification/Communication 106 Interface to send the communication with a partial command for a set-top box. In one or more embodiments, the user may send the communication directly to a server known to have software to handle requests for interpretation of partial commands for a set-top box or the communication may be sent directly to a set-top box. Those skilled in the art will recognize that there are many ways to identify a communication that contains partial commands for a set-top box. The communication may be sent directly to a set-top box with a communication interface and a notification module to interpret the partial command, as shown in FIG. 2.

In some embodiments, a partial command may be identified in a communication at any server intercepting communications, parsing at least a portion of the communication, and recognizing the portion of the communication as indicated that the communication contains a partial command. For example, the communication may be written in a language developed for communicating partial commands or contain some form of identifier indicating the communication contains a partial command.

After the communication is received, the partial command is interpreted in view of the notification (904). In order to interpret the partial command, the partial command may be extracted from the communication by parsing the communication and the partial command may be interpreted with a notification retrieved from a database. For example, a communication with a partial command "Stop Download" that references a monitoring notification "Pay per view is being downloaded to set-top box A" can be interpreted to be a command to prevent the download of the pay per view content at set-top box A. The communication may reference the appropriate notification to allow for interpretation of the partial command with the correct notification. As described above, the communication may be identified as containing a partial command and any information that makes the partial command incomplete as a command for a set-top box may be inferred or interpreted with the use of a notification.

A command may then be sent to a set-top box based on the partial command and the notification (906). The command may then be executed by the set-top box. As indicated above, the set-top box may perform the interpretation of the partial command and execute the command.

Figure 10:
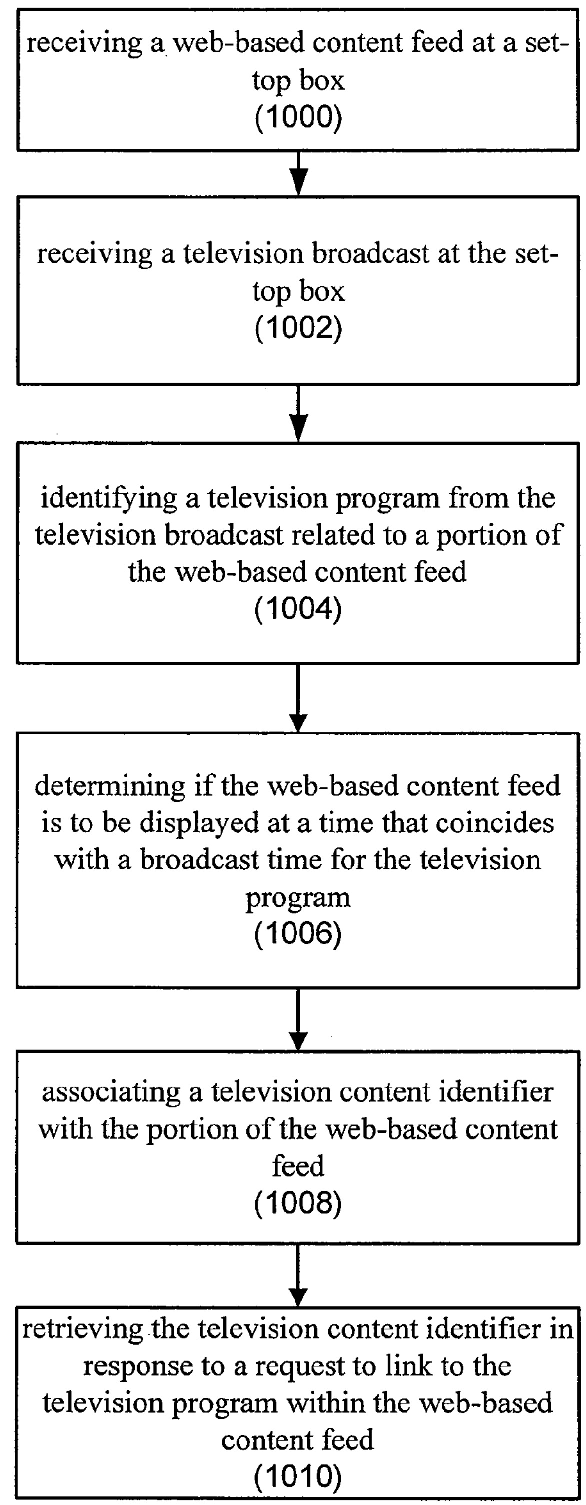
FIG. 10 is a flow chart for implementing the provision of a web-based content feed in accordance with an embodiment of the present invention.

FIG. 10 is a flow chart for implementing the provision of a web-based content feed in accordance with an embodiment of the present invention. Initially, a content feed is received at a set-top box (1000). A content feed is a summary of frequently updated content. The content feed itself may consist of one or more content summaries for each piece of content provided in the content feed. A content summary provides information on content, such as a description, title, publication date, or any other relevant information on the content. In one or more embodiments, the content feed may be an XML document with one or more document elements provide a summary of content. Embodiments may use a content feed that is an aggregation of content feeds and/or content feed documents from various sources (e.g., RSS). A user may subscribe to receive content feeds from one or more sources. A content feed reader may be employed to extract information on each piece of content from the document to display the content. A web-based content feed may provide links to web pages that provide further information on content summarized in the content feed. In one or more embodiments, a web-based content feed may be subscribed to by a user on a web page.

In one or more embodiments, the content feed may be retrieved from a content feed database 130 with a content feed module 126. The content feed module 126 may be software executing on a content feed server 128 that handles requests for links to television programs to be placed in a web-based content feed. The content feed module 126 may service requests by providing television content identifiers to allow retrieval of the television program or by providing a web-based content feed with embedded links to the television programs. A television content identifier provides enough information to allow for the retrieval of a television program associated with the television content identifier in a television broadcast.

Next, a television broadcast is received at a set-top box (1002). The television broadcast has audio and visual content for one or more television programs. A user may select a particular television program from the television broadcast to be displayed with the user interface for the set-top box.

A television program is then identified from the television broadcast that relates to a portion of the web-based content feed (1004). The television program may relate to content in a web-based content feed if the television program may provide more information on the content summarized within the web-based content feed. In one or more embodiments, metadata associated with a television program may indicate that the television program is related to a content summary within the web-based content feed. Some embodiments may rely on a third-party to provide information on both the content in a web-based content feed and a television programs.

A determination is made as to whether a portion of the web-based content feed is selected for display at a time that coincides with a broadcast time for the television program (1006). If the portion of the web-based content feed that relates to the content in the feed is displayed when a television program is scheduled to be broadcast, then a link to the television program may be displayed with the web-based content feed. Broadcast times for the television programs may be obtained by querying a program guide database. By providing the link in the web-based content feed, the viewer may select the link and have media content displayed switched to the television program that provides further information on the content displayed in the web-based content feed.

In one or more embodiments, the link to the content is only provided in the web-based content feed if the user indicates that the content is of interest to a viewer of the set-top box. A viewer may provide content preferences indicating types of content that the user would like to receive links for in a web-based content feed. For example, a viewer may indicate keywords (e.g. Embarq) or content categories (e.g. U.S. news) are content preferences, and the links should be provided if the keyword is in the web-based content feed or the content in the web-based content feed falls into a particular category.

Next, a television content identifier is associated with a portion of the web-based content feed (1008). The television content identifier allows for the retrieval of the television program in the television broadcast. The television content identifier may be a television channel, an address for stored content, or any identifier that provides access to content. The television content identifier is stored in a database and may be associated with the portion of the web-based content feed in the database.

The television content identifier is retrieved in response to a request to create a link (1010). If links to television programs are desired in a web-based content feed, then the television content identifiers may be retrieved that relate the respective portions of the web-based content feed and such television content identifiers may be embedded in the web-based content feed. In one or more embodiments, content preference may dictate when a link to a television program should be provided in the web-based content feed.

Figure 11:
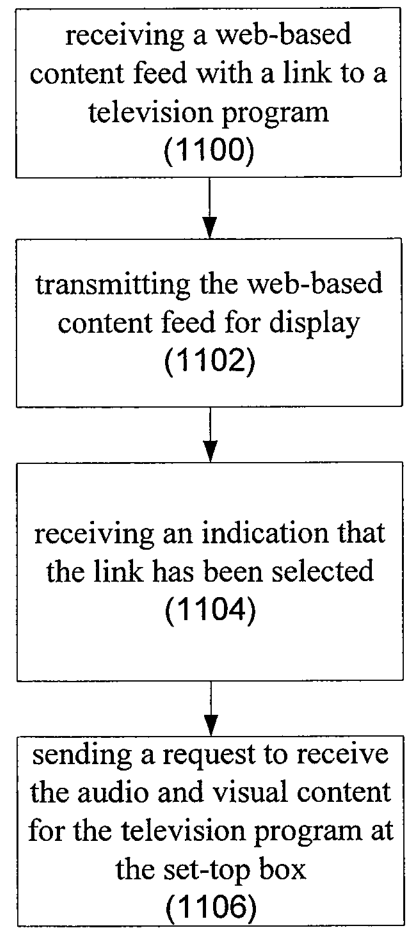
FIG. 11 is a flow chart for implementing the provision of a web-based content feed in accordance with an embodiment of the present invention.

FIG. 11 is a flow chart for implementing the provision of a web-based content feed in accordance with an embodiment of the present invention. Initially, a web-based content feed with a link to a television program is received (1100). The web-based content feed may be received by a set-top box.

Next, the web-based content feed is transmitted for display (1102). The web-based content feed may be displayed on the display for a set-top box along with media content received with the set-top box. For example, the web-based content feed may be displayed at the bottom of a screen with a television program that the viewer has previously selected.

An indication may be received that the link has been selected (1104). A viewer of a set-top box may use the set-top box user interface to indicate the selection of the link. After receiving an indication that the link has been selected (1104), a request is sent to receive the audio and visual content for the television program at the set-top box (1106). In one or more embodiments, the receipt of the audio and visual content for the television program does not disturb the receipt of the media content that the viewer of the set-top box previously selected. For example, the television program may be displayed with previously selected media content using picture-in-picture (PIP), the television program or the media content previously selected may be paused or recorded on a digital video recorder or otherwise recorded or downloaded. In an embodiment, when a content feed is received associated with a particular keyword, a television broadcast is automatically selected for display by a set-top box on a television without the need for a viewer's selection of a link. In such an embodiment, a PIP may be utilized to display to a viewer a broadcast of a news event associated with a content feed of the viewer automatically without viewer intervention.

FIG. 12 depicts a user interface for implementing the provision of a web-based content feed in accordance with an embodiment of the present invention. In FIG. 12, a web content feed user interface entitled "Web content feeds—User Settings" 1200 is provided as an example of an interface for the present invention. It will be understood by those with skill in the art that any number of interfaces may be provided to create, delete, and update web content feed preferences. Embodiments of the present invention may request that security information be input in order to create reminder notifications, such as a username and password as shown for "Account Number 1234567" in FIG. 12. The following ways to provide input for creating content preferences are depicted 1202: a text input for a content preference name and content preference is entitled "Feed Name-Content Preference," a text input for a content feed entitled "Feed Site," and a text input for a recipient entitled "Content Receiver." Examples of ways to present input to edit notification preferences are depicted in locations 1204 and 1206: a text input for a content preference name entitled "Feed Name," a text input for a content preference entitled "Content Preference," a text input for a content feed entitled "Feed Site," and a text input for a recipient entitled "Content Receiver."

Figure 13:
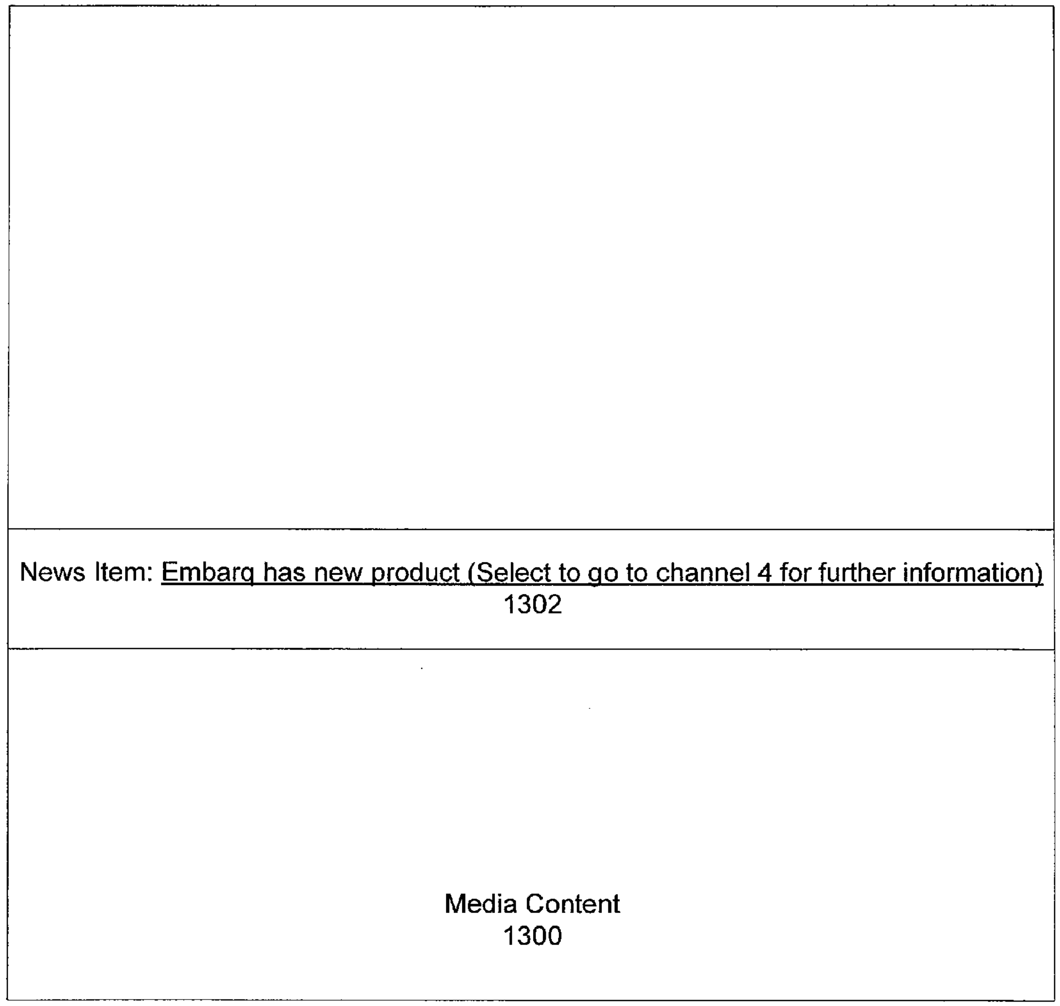
FIG. 13 depicts a user interface for implementing the provision of a web-based content feed in accordance with an embodiment of the present invention.

FIG. 13 depicts a user interface for implementing the provision of a web-based content feed in accordance with an embodiment of the present invention. Media content 1300 received by a set-top box is displayed on a display 1300. A web-based content feed 1302 with content summary for a news item is displayed. The content summary on the web-based content feed is entitled "Embarq has new product" and has a link to "channel 4." The web-based content feed provided in FIG. 13 corresponds to the "Content Preference A" 1204 in FIG. 12. The link provided in 1302 has a keyword "Embarq" indicated as a content preference in "Content Preference A" 1204.

Figure 14:
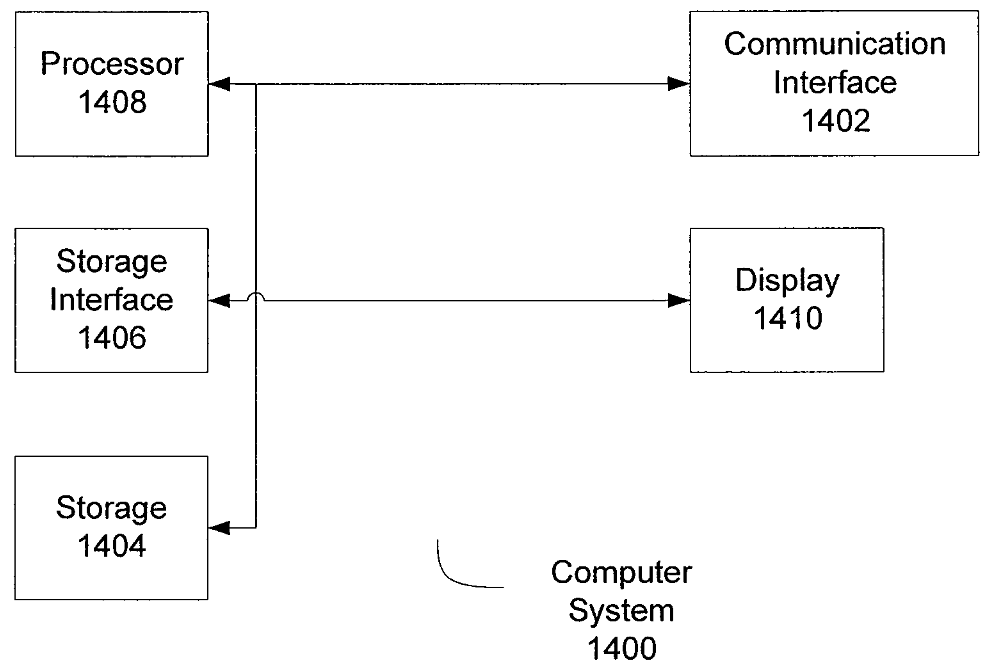
FIG. 14 depicts a system architecture in accordance with an embodiment of the present invention.

FIG. 14 depicts a system architecture in accordance with an embodiment of the present invention. The execution of instructions required to practice the invention may be performed by any number of computer systems 1400 as depicted in FIG. 14. As used herein, the terms computer system and computing system are broadly used to describe any computing device that can store and independently run one or more programs, applications, scripts, or software processes/routines. Implementations of the present invention may have a single computer system 1400 or any number of computer systems 1400.

Computer systems 1400 may communicate with other computer systems/devices with any number of communication interface(s) 1402. The communication interface 1402 may provide the ability to transmit and receive signals, such as electrical, electromagnetic or optical signals, that include data streams representing various types of information (e.g. messages, communications, instructions, and data). The communication interface 1402 may provide an implementation for a communication protocol. Instructions may be executed by the processor 1408 upon receipt and/or stored in storage 1404 accessible to the computer system 1400.

Storage 1404 may be accessed by the computer system 1400 with a storage interface 1406. The computer system 1400 may use the storage interface 1406 to communicate with the storage 1404. The storage interface 1406 may include a bus coupled to the storage and be able to transmit and receive signals. Storage 1404 may include random access memory (RAM) or other dynamic storage devices, for storing dynamic data and instructions executed by a processor 1408. Any number of Processor(s) 1408 may be used to execute instructions for the computer system 1400. Storage may include, but is not limited to, read only memory (ROM), magnetic disks, flash drives, usb drives, and optical disks. A computer system 1400 may be connected to a display 1410 for displaying information to a user.

"Computer usable medium" or "Computer readable medium" refers to any medium that provides information or may be used by a processor 1408. Medium may include volatile and non-volatile storage mediums.

The detailed description provides examples of a small number of embodiments for implementing the invention and is not intended to be limiting in scope.

What is claimed is:

1. A method for providing a reminder notification, comprising:

subscribing to a third party notification service;

compiling, by the third party notification service, a history of media content received by a set-top box;

determining, by the third party notification service, a reminder notification rule for a user based on the compiled history of media content received by the set-top box;

querying, by the third party notification service, a database for one or more selections of future scheduled media content receivable by the set-top box in accordance with the reminder notification rule;

sending, by the third party notification service, a reminder notification to the user based on a query result, the reminder notification indicates that one or more selections of scheduled media content based on the reminder notification rule is accessible utilizing the set-top box;

receiving a voice message over a telephone network in response to the reminder notification, wherein a partial command is generated from the voice message left by the user for the set-top box, to perform commands relating to the reminder notification.

2. The method of claim 1, wherein the reminder notification rule includes a rule to notify the user of any sitcom episode broadcast during primetime viewing hours that has not been previously viewed or recorded by the user based on the compiled history of media content received by a set-top box.

3. The method of claim 1, wherein the reminder notification is provided in a web-based content feed to the user.

4. The method of claim 1, wherein the reminder notification comprises a message sent to a mobile device.

5. The method of claim 1, wherein the reminder notification is sent to all members of a social network group associated with the user.

6. A third party notification system for providing a content reminder, comprising:

a processor operable to execute a set of instructions; and a non-transitory computer readable medium in communication with the processor, the non-transitory computer readable medium operable to store a set of instructions, wherein the processor executes the set of instructions to:

enable a subscriber to subscribe to a third party notification service provided by the third party notification system;

compile a history of media content received by a set-top box;

determine a reminder notification rule for the subscriber, the reminder notification rule comprises identifying media content that may be of interest to the subscriber based on the compiled history of media content received by the set-top box;

query a database for one or more selections of scheduled media content of the set-top box in accordance with the reminder notification rule;

send a reminder notification to the subscriber based on a query result;

enable the subscriber to receive a voice message over a telephone network in response to the reminder notification, wherein a partial command is generated from the voice message left by the subscriber for the set-top box, to perform commands relating to the reminder notification.

7. The system of claim 6, wherein the processor further executes the set of instructions to provide the reminder notification in a web-based content feed to the subscriber.

8. The system of claim 6, wherein the reminder notification rule includes a rule to notify the subscriber of any sitcom episode broadcast during primetime viewing hours that has not been previously viewed or recorded by the subscriber based on the compiled history of media content received by the set-top box.

* * * * *